(12) United States Patent  (10) Patent No.: US 8,085,763 B2
Niccolini et al.  (45) Date of Patent: Dec. 27, 2011

(54) METHOD FOR PROTECTING SIP-BASED APPLICATIONS

(75) Inventors: Saverio Niccolini, Heidelberg (DE);
Sandra Tartarelli, Heidelberg (DE);
Roman Schlegel, Heidelberg (DE);
Marcus Brunner, Heidelberg (DE)

(73) Assignee: NEC Corporation, Tokyo (JP)

( * ) Notice: Subject to any disclaimer, the term of this patent is extended or adjusted under 35 U.S.C. 154(b) by 453 days.

(21) Appl. No.: 11/698,048

(22) Filed: Jan. 26, 2007

(65) Prior Publication Data

US 2007/0177607 A1 Aug. 2, 2007

(30) Foreign Application Priority Data

Jan. 27, 2006 (DE) .......................... 10 2006 004 202

(51) Int. Cl.
*H04L 12/50* (2006.01)
(52) U.S. Cl. ........ 370/373; 370/352; 370/392; 709/224; 726/23; 726/25
(58) Field of Classification Search ............... 370/395.5, 370/389, 373, 356, 230, 231; 726/11, 22, 726/23, 14, 1; 369/112.1, 13.56
See application file for complete search history.

(56) References Cited

U.S. PATENT DOCUMENTS

| 5,210,820 | A | * | 5/1993 | Kenyon | 704/200 |
| 7,283,969 | B1 | * | 10/2007 | Marsico et al. | 705/1 |
| 7,535,905 | B2 | * | 5/2009 | Narayanan et al. | 370/392 |
| 7,568,224 | B1 | * | 7/2009 | Jennings et al. | 726/14 |
| 2003/0145225 | A1 | * | 7/2003 | Bruton et al. | 713/201 |
| 2004/0015719 | A1 | * | 1/2004 | Lee et al. | 713/201 |
| 2005/0273855 | A1 | * | 12/2005 | Oberle et al. | 726/22 |
| 2007/0121596 | A1 | * | 5/2007 | Kurapati et al. | 370/356 |
| 2008/0040801 | A1 | * | 2/2008 | Buriano et al. | 726/22 |

FOREIGN PATENT DOCUMENTS

| EP | 1 605 661 | 12/2005 |
| JP | 2004-343580 | 12/2004 |
| JP | 2005-175714 | 6/2005 |
| JP | 2006-023934 | 1/2006 |
| JP | 2006-100873 | 4/2006 |

OTHER PUBLICATIONS

Japanese Patent Office issued a Japanese Office Action dated Feb. 10, 2010, Application No. 2007-012235.

* cited by examiner

*Primary Examiner* — Michael J Moore, Jr.
(74) *Attorney, Agent, or Firm* — Young & Thompson

(57) ABSTRACT

A method for protecting SIP (Session Initiation Protocol)-based applications wherein SIP messages are analyzed and malicious SIP messages that potentially constitute a security risk for the SIP-based application are identified is discloses. Regarding a realization of a particularly high security [level] with means that are easy to implement—a pre-definable number N of pre-configurable parameters—identities—is extracted from the SIP messages and that for each SIP message a comparison of the identities with the identities extracted from previous SIP message is performed, on the base of which a maliciousness level ML is assessed for every SIP message.

24 Claims, 5 Drawing Sheets

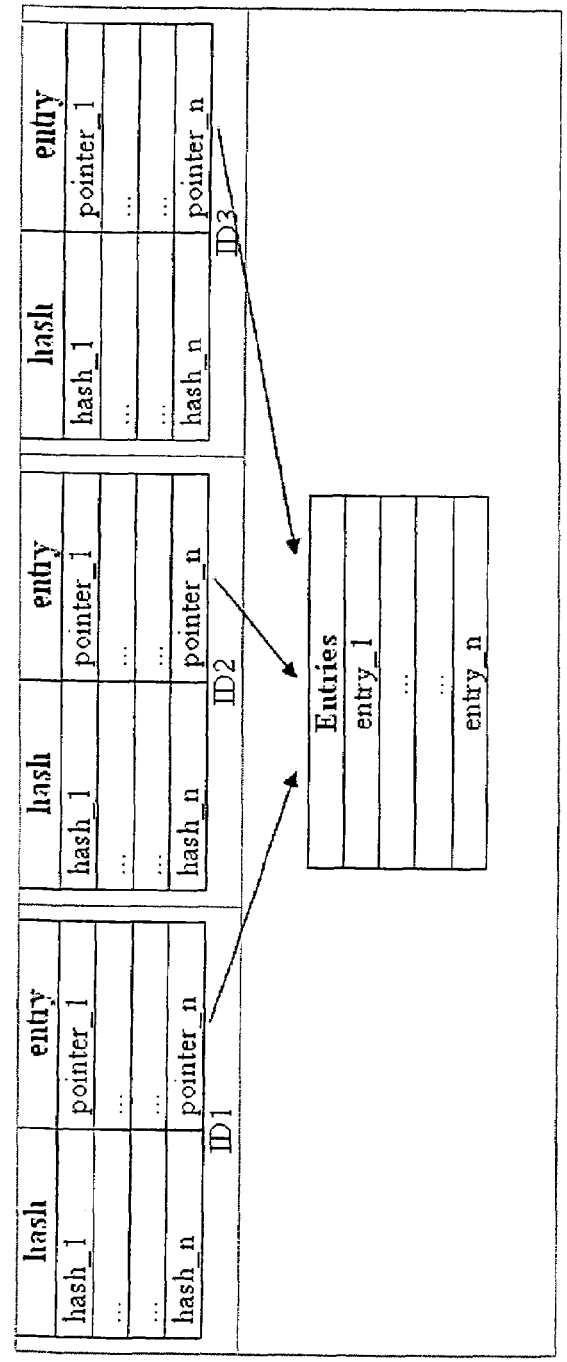

US 8,085,763 B2

METHOD FOR PROTECTING SIP-BASED APPLICATIONS

BACKGROUND OF THE INVENTION

1. Field of the Invention

The present invention relates a method for protecting SIP (Session Initiation Protocol)-based applications wherein SIP messages are analyzed and malicious SIP messages that potentially constitute a security risk for the SIP-based application are identified.

2. Description of the Related Art

The Session Initiation Protocol (SIP) is a standardized network protocol to establish a session between two or more participants. SIP is supported by devices of many manufacturers and has developed into a widely used protocol for Voice over IP (VoIP) over the last years. The application of SIP is not restricted to Internet telephony, but communication sessions can be established for a multitude of different data streams. SIP only serves the establishment of a communication session, whereas the exchange of the actual communication data is performed over other protocols—Session Description Protocol (SDP), Real-time Transport Protocol (RTP).

Whereas SIP is advantageous in terms of easy implement ability, scalability, expandability and flexibility, it is rather poor regarding security of applications and identity management. The security risk consists in the possibility that malicious users can retrieve unsecured information in order to launch security attacks on the SIP-based system. Currently, there are efforts at the IETF to standardize a complete set of security protocols and applications in order to add security relevant features to SIP-based applications. But even if these efforts succeeded, such standards will not result in 100% security that cannot be broken with appropriate knowledge by a malicious user.

Regarding a secure identity management, there will for sure always be some SIP service providers in the future that will be ready to disclose SIP identities, even if such standards will be available. With such an insufficient identity management there is the security threat that malicious users catch a multitude of SIP identities in order to launch security attacks against SIP-based systems on said base.

In the following, two different kinds of security attacks of essential importance will be looked at in detail. First of all, they are attacks that aim at disturbing or interrupting services and are known as DoS (Denial of Service) attacks. The others are social attacks that are known in the context of Internet telephony as SPIT (Spam over Internet Telephony). The threat of SPIT is comparable to the threat as known from Spam in e-mail traffic; the only difference is that the unwanted messages are distributed in form of phone calls. In practice this can mean that one person gets hundreds of phone calls that only contain publicity messages, or that the phone rings all the time. Against the background of the rapid development and distribution of the Internet telephony it has to be feared that DoS attacks and SPIT will also become dominant in the telephony world.

Technologies to prevent DoS attacks that are available nowadays are mainly based on a strict syntax analysis (parsing) of the SIP protocols of dialogues and transactions in order to find inconsistencies in the protocols that may result in an interruption of services. Those messages, where a deviation from the SIP syntax is detected, are discarded.

Other methods to protect SIP-based applications against DoS attacks take advantage of the fact that a system overload can result in an interruption of service and aim therefore at a limitation of the SIP traffic to a maximum rate allowed for SIP messages, in order to prevent an overload of the SIP system.

Technologies to prevent SPIT attacks available nowadays are mainly based on white and black listing and on content filtering. The content filtering of a voice call is performed by some kind of Turing test which aims at finding out whether the caller is a human being or a machine. Other recently proposed methods consider also social networks between users, as well as friendship relationships that use buddy lists.

Regarding the identity management as mentioned above, the known methods also have some disadvantages. For example, e-mail systems try to identify the sender by the original IP address of the sender in the header of the e-mail message. Based on this information, the e-mail systems perform DNS checks. It is a problem that malicious senders do not insert their real IP address or domain name, so the known systems do not match correctly. Anyway, such analyses are in case of real-time communications, as addressed here, not applicable anyway, because they run on different time scales. For example, e-mail applications are no real-time applications, whereas VoIP—as real-time application—cannot wait until a DNS name has been checked. In addition, there are completely different traffic characteristics, because the simultaneous sending of a multitude of e-mail messages cannot be regarded as malicious action, but is a common usage. In contrast, this traffic characteristic would have to be regarded most probably as malicious in case of a SIP-based application. Consequently, the methods for security and identity management as known from the e-mail world cannot be transferred in any way to SIP-based applications.

SUMMARY OF THE INVENTION

Hence, the present invention is based on the task to design and further develop a method for protecting SIP-based applications of the above-mentioned kind, according to which a very high level of security is realized by means that are easy to implement.

According to the invention, the task mentioned above is solved by a method showing the characteristics of patent claim 1. According to this, such a method is designed and further developed in such a way that always a pre-definable number N of pre-configurable parameters—identities—is extracted from the SIP messages and that for each SIP message a comparison of the identities with identities extracted from previous SIP messages is performed, on the base of which a measure of maliciousness (maliciousness level (ML)) is assessed for every SIP message.

According to the invention, it has been recognized that a particularly high level of security for SIP-based applications can be achieved by creating the opportunity for a broad analysis in terms of taking many different identities into account. According to the invention, first of all, a pre-definable number N of pre-configurable parameters, which in the following will be referred to as identities, is extracted. According to the invention, in the following a maliciousness level ML is assessed for every SIP message by comparing the identities of each SIP message with extracted identities of previous SIP messages. With the method according to the invention a multitude of security-relevant aspects of SIP transactions can be considered which incurs a significantly improved security compared to known methods where only single aspects, for example the syntax of the SIP messages are taken into consideration. In other words, the key issue is that not only a single parameter is checked, but that (N−1) further parameters are included in the check. The method according to the invention hence resolves the problems described in the beginning in the context of specific traffic characteristics, because the traffic characteristic only enters the check which is according to the invention designed to be performed on a broad basis as a partial aspect.

The method according to the invention is in addition easy to implement, because basically only comparison operations need to be performed which do barely require any specific hardware. Moreover, the method according to the invention can be adjusted to different environments to be analyzed in a very easy and flexible way. For example, in case of SIP transactions with sensitive data where security has utmost priority, N can be chosen to be large, i.e. the identification of malicious SIP applications will be performed on the base of a multitude of different aspects. In contrast, N can be chosen to be small if security is not such a dominant issue and/or if the resources available for a security check are very limited.

Concretely, the analysis and identification can be performed by, for example, a session border controller (SBC), an application layer firewall, a proxy server, a back-to-back user agent or by a client or anything alike.

Regarding the extracted identities, it can be provided that they are user-specific parameters on the one hand and/or device-specific parameters on the other hand. In a particularly advantageous way, the SIP URI (Uniform Resource Identifier) of the party sending the message is extracted as an identity. The SIP URI in general has the form of "user@domain" and is the most meaningful identity, so it has proven to be advantageous to always include this one in the extracted set of identities. In addition (or alternatively) the MAC address, the host identity protocol (HIP) identifier, the SIP Via header field value, the SIP Contact header field value and/or the SDP protocol header field values containing the IP address and/or the ports of the sending party. The enumeration is not complete and it goes without saying that other parameters can be extracted as well.

Regarding a simple and clear storage of the values of the extracted parameters it can be provided that always the result of a transformation executed on the extracted values is used as identity. In a particularly advantageous way, the transformation can be the application of a hash function.

In the context of a particularly preferred embodiment, the generation of an N-dimensional hyperspace is provided, wherein the N dimensions of the space are spun by the given identities. In a particularly clear and easy way each SIP message can then be represented as one point in the hyper space by enlisting the extracted identities on the axes in the hyperspace. A point means an N-dimensional tuple which comprises the values of the pre-defined N-identities extracted from the respective SIP message Regarding a possibly comprehensive and efficient usage of the information available, the maliciousness level of an n-th message can be determined as a function f of points of previous messages enlisted in the hyperspace. n is a place holder representing the temporal order of arrival of the messages. In other words, in order to define the maliciousness level ML of an n-th message the previously gained information extracted from the first, second, . . . (n−1)-th message can be used.

For analyzing a multitude of arriving messages over a longer period of time independently, i.e. without intervention of an operator, and regarding a limitation of the required storage need, it is advantageous to erase the points according to their entry order from the hyper space after a pre-configurable period. In order to evaluate the maliciousness level ML of an n-th message, there are hence not the messages 1, 2 . . . , n−1 available anymore, but only the messages i, i+1, . . . , n−1, where 1<=i<n. The period for which the points remain stored in the hyperspace is a configurable parameter and can be pre-configured or can be dynamically adjusted to the respective current concrete situation during the analysis, preferably with consideration of the data rate.

Regarding the function f it can be provided that it is chosen in such a way that the maliciousness level ML for an n-th message is different from zero if the comparison shows that at least one identity of the n-th point, i.e. of the point of the n-th message, matches an identity of at least one of the entered points. Moreover, the function f can have the characteristic that the maliciousness level ML of an n-th message increases as the number of entered points, of which at least one identity matches the corresponding identity of the point of the n-th message, increases. Moreover, the function f can have the characteristic that the maliciousness level ML of an n-th message increases the more the number of matching identities between one of the entered points and the point of an n-th message is.

In case of specific identities it can be relevant not only to know whether two values match or differ, but moreover to know the exact values of the identities. The SIP identities would be an example for such a case. If you have a look at, for example, the identities SIP ID_1=user1@domain1, SIP ID_2=user2@domain1 and SIP ID_3=user3@domain2, then these all differ from each other, but from the point of security technology, it makes a difference whether a message originates from the same user from different domains or from different users of the same domain.

In order to respect these differences when evaluating the maliciousness level ML, the introduction of the concept of distances is beneficial and advantageous. The maliciousness level ML can then be computed as sum of pre-configurable distances of the points in the N-dimensional hyperspace. In the example given above, the distance between SIP ID_1 and SIP ID_2—dist(ID_1;ID_2)—can be attributed another value than the distance between SIP ID_1 and ID_3—dist(ID_1;ID_3). The concrete values of the individual distances can be fixed in advance during exploration. Alternatively, the concrete values of the individual distances can be adjusted dynamically to specific situations.

Regarding an efficient storage of the N-dimensional identities, an implementation by using hash tables can be provided. Hash tables allow for a quick finding of matching entries on the one hand and restrict the complexity of storing on the other hand. Concretely, for example, a hash table can be used for each identity. In the key column of the hash tables the corresponding hash value of the respective identity could be stored, as well as the set of identities (N-tuple) could be stored as entry.

Regarding a further optimization of the complexity in terms of memory, in the hash tables so-called "shared entries" can be provided, wherein in the key columns of the hash tables the respective hash value of the corresponding identity is stored in turn, though only pointers to the shared set of identities (N-tuple) are stored as entries. By these means, the complexity in terms of memory can be reduced significantly again.

Regarding a further increase in efficiency, it is particularly advantageous to analyze syntactically correct SIP messages only. In order to do so, a syntax analysis performed beforehand (parsing), as it is known from the state of the art, can be provided, and only analyze those SIP messages that have passed the syntax analysis without showing any suspicious features.

For the maliciousness level ML, threshold values can be set and when exceeding these threshold values, a SIP message will be categorized as malicious. In an advantageous way and regarding the very best flexibility, the threshold values can dynamically be updated. Concretely, the threshold values can be updated dynamically on a time-basis, because by doing so the fact of data traffic patterns at peak times differing clearly from data traffic patterns that can be observed during night time can be considered. A dynamic update could also be performed on the base of experienced values regarding the efficiency of the analyses performed up to that time. It can be envisioned, for example, that a threshold defined by the value z is decreased if a specific attack causes a crash of the system, i.e. in order to better protect the system against such an attack.

In order to protect the system, it can be provided that a SIP message, identified as malicious, triggers an alarm and/or is blocked. The generating of an alarm could in addition be used as trigger to trace back malicious messages to their origin. To do so, a post-processing algorithm could be applied identifying malicious behavior developing over time. A simple implementation of such a scheme can consist in identifying a malicious sender either by his SIP URI, by his IP address, or in a similar way. After performed identification, the malicious user could be (temporarily) blocked from accessing the protected system by blocking all traffic originating from him.

In the context of an advantageous design, two or several thresholds could be set, and exceeding of each of them has different consequences. For example, exceeding the first low threshold could result in the fact that the sender has to pass additional tests before he will be allowed to access the protected system. Only exceeding the second higher threshold could trigger a blocking of access, wherein temporarily restricted, as well as final blocking of access can be envisioned.

Now, there are several options of how to design and to further develop the teaching of the present invention in an advantageous way. For this purpose, it must be referred to the claims subordinate to claim 1 on the one hand and to the following explanation of preferred examples of an embodiment of the method according to the invention for protecting SIP applications on the other hand. In connection with the explanation of the preferred examples of an embodiment and the figure, generally preferred designs and further developments of the teaching will also be explained.

BRIEF DESCRIPTION OF THE DRAWINGS

FIG. 2 is a diagram showing a scheme of storing identities in hash tables with doubled entries;

FIG. 3 is a diagram showing a scheme of storing identities in hash tables with shared entries;

DESCRIPTION OF THE PREFERRED EMBODIMENTS

Figure 1:
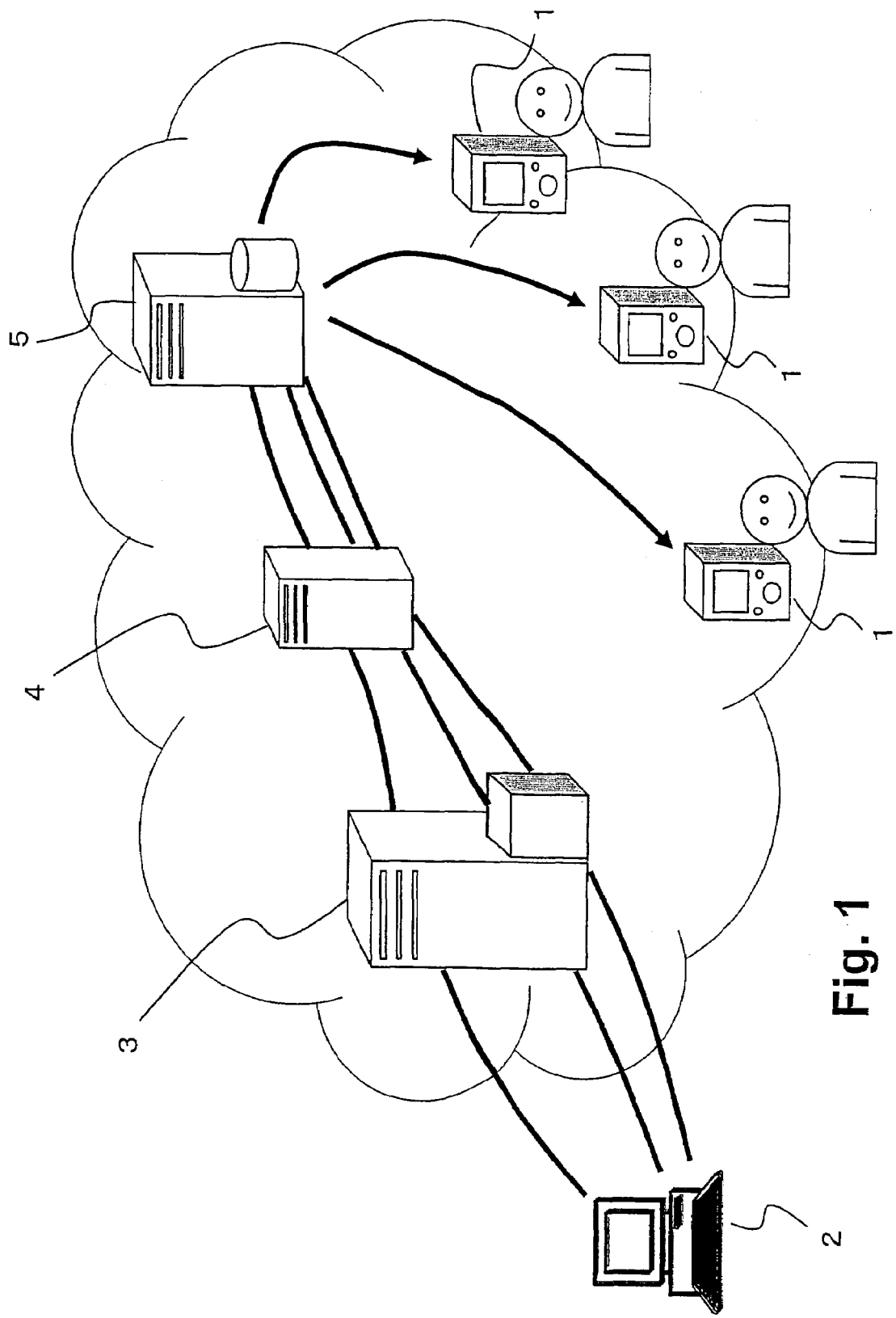
FIG. 1 is a diagram showing a scheme of an example of an embodiment of a method according to the invention to protect SIP-based applications.

FIG. 1 shows in a scheme the basic functionality of the method according to the invention. Three SIP clients 1 communicating by SIP transactions over a network, which is indicated as a cloud, are depicted. To protect SIP-based applications from attacks of a malicious user 2, a pre-defined number N (N>1) of pre-configurable parameters, so-called identities, are extracted from the SIP messages which the SIP clients 1 exchange between each other or with the rest of the world.

For every SIP message a comparison of the identities is made with the identities extracted from previously exchanged SIP messages. Then, for every SIP message a maliciousness level ML is assessed on the base of the performed comparison. The analysis of the SIP messages, as well as their identification as malicious can be performed by a multitude of devices. At least one of these devices includes SIP message analyzer, identity extractor, identity comparator and maliciousness level assessment section. In FIG. 1 only three examples of possible devices are given. Concretely, they are a firewall 3, a back-to-back user agent 4 and a proxy server 5.

In FIG. 2, a concrete storing mode to store the N-dimensional identities is depicted in a table. It is an implementation that uses hash tables for data storage. The table depicted in FIG. 2 works with duplicated entries. In other words, the implementation uses a hash table for each identity. The key column of each hash table is the hash value of the respective identity while the entries contain the set of identities. This means that in case of N identities each set of identities (or transaction) is N-times duplicated. This leads to a complexity in terms of memory to be computed by $N*n*N*a$, wherein n is the number of entries (or the number of analyzed messages), a is the size of an identity element and N is the number of identities. Consequently, the complexity depends quadratically on the number of identities. This means that doubling the number of identities quadruples the complexity in terms of memory. Regarding the number of transactions n, the complexity is linear.

FIG. 3 shows an implementation of a storage that is optimized with regard to the complexity in terms of memory compared to the implementation according to FIG. 2. The optimization is achieved by using shared entries. Whereas for each identity a hash table is used, the entries in the hash table do not contain a complete entry, but only a pointer to a shared set of identities. This kind of storage results from a complexity in terms of memory, that is computed as $N*n+N*n*a$, wherein the terminology is identical with the terminology explained in the context of FIG. 2. Hence, the memory in terms of complexity is linear with respect to the number of identities N, as well as with respect to the number of transactions n. Assuming an insignificant number of collisions in the hash tables, which can be achieved by choosing the hash table size large enough, the computational complexity is linear with the number of entries/transactions. Moreover, the search is linear with the number of identities.

Figure 4:
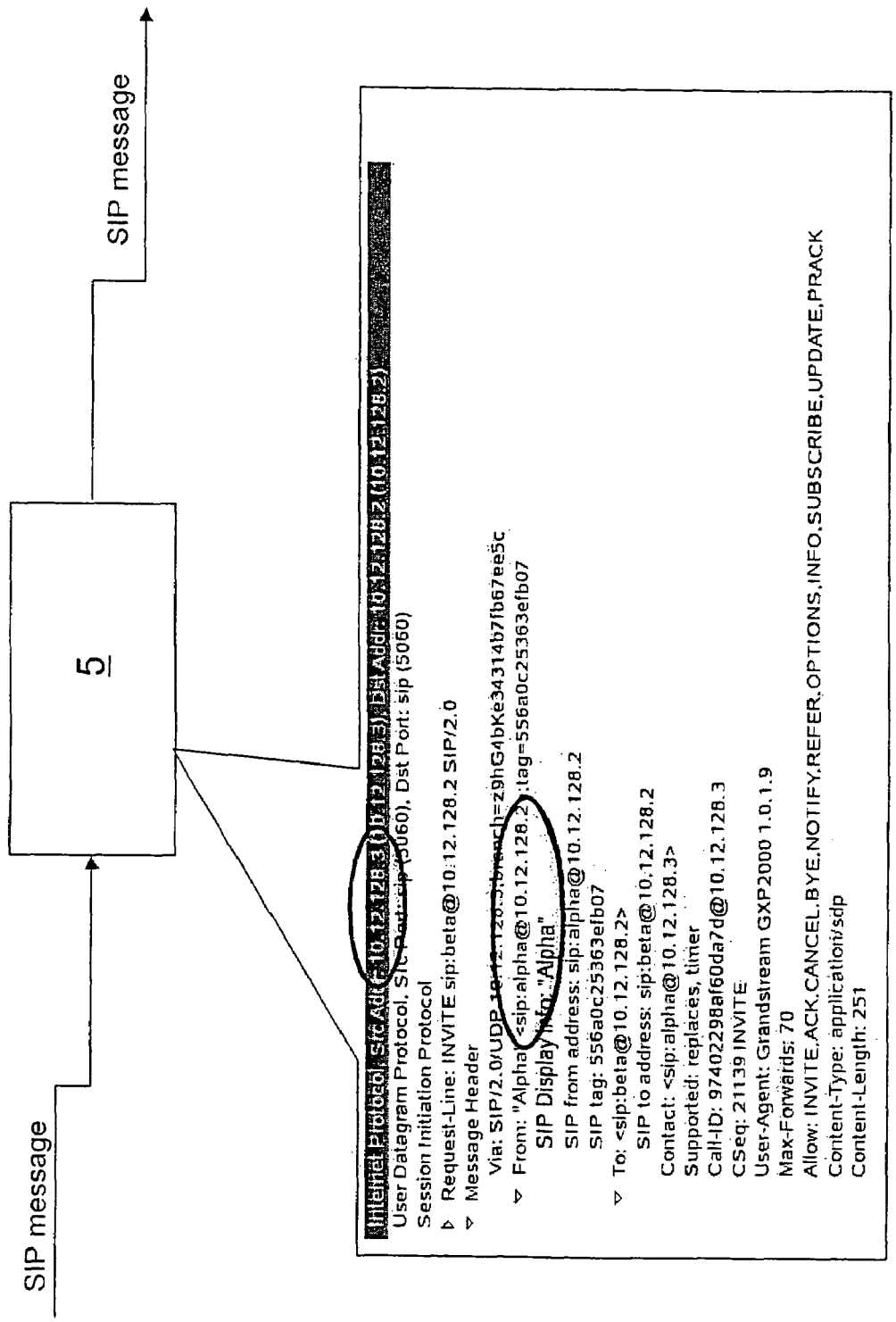
FIG. 4 is a diagram showing a scheme of extracting different identities from a SIP message.

FIG. 4 shows schematically an application of an example of the method according to the invention. For the purpose of analysis, a SIP message passes a device, which is shown in the concrete example as proxy server 5. The proxy server 5 extracts two identities from the SIP message, i.e. the SIP identity itself and the IP address of the sender of the SIP message. Consequently, N=2. In case that the IP address, from which the SIP message was received, is not available as parameter, because the application does not have access to IP layer information, the application could extract the IP address parameters from the SIP message body, wherein the IP address could, for example, be written in the SIP VIA header.

Figure 5:
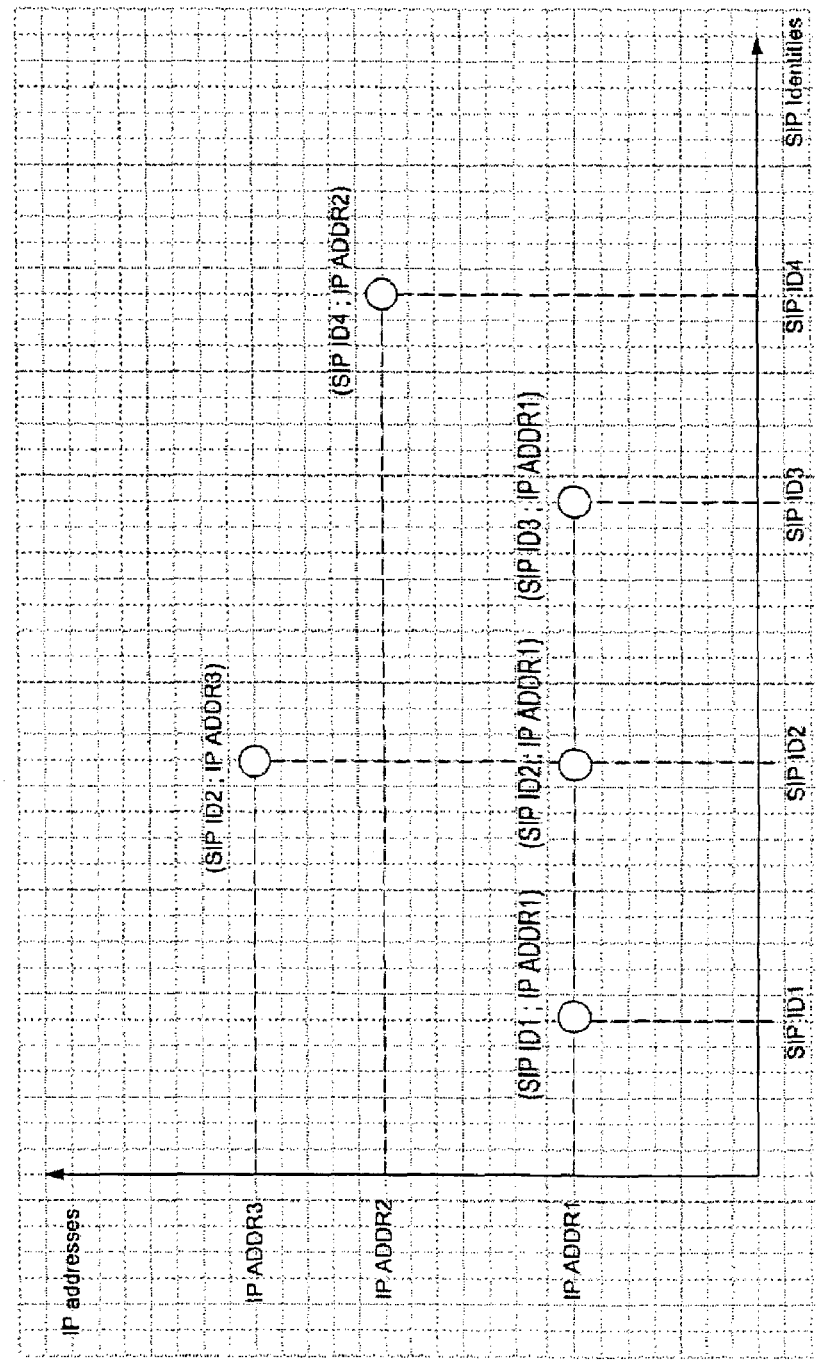
FIG. 5 is a diagram showing an example of an embodiment of a hyperspace of the dimension N=2.

In FIG. 5 a two-dimensional hyperspace, i.e. a plane, is shown that is spun by the SIP identity as first extracted parameter (plotted on the x-coordinate) and the IP address as second extracted parameter (plotted on the y-coordinate). Altogether, five points are shown and represent five analyzed SIP messages, wherein in the following the subsequent order of arrival will be assumed:

(SIP ID1=user1@domain1;IP ADDR1);
(SIP ID2=user2@domain1;IP ADDR3);
(SIP ID2=user2@domain1;IP ADDR1);
(SIP ID3=user3@domain2;IP ADDR1);
(SIP ID4=user4@domain1;IP ADDR2);
At the arrival of the n-th message, the following steps are performed:

The n-th point $\overline{P_n}$ is inserted into the hyperspace which is—as already explained—in the concrete example a plane.

Points that are already inserted in the plane, i.e. correspond with previously analyzed messages and either have the same SIP identity or share the same SIP address with $\overline{P_n}$ are identified.

The maliciousness level ML is computed as:

$$ML_{(\overline{P_n})} = \sum_{IP\,ADDR_{\overline{P_n}}} dist(SIP\,ID_{\overline{P_n}}, SIP\,ID_k) \sum_{SIP\,ID_{\overline{P_n}}} dist(IP\,ADDR_{\overline{P_n}}, IP\,ADDR_k)$$

k varies on all points identified in step 2.

For the computation of the ML, the concept of distances has been introduced which enables to not only consider the comparison of identical/non-identical when computing ML, but also the exact values of the identities. The values assumed by the distances are configurable parameters in the system.

Figure 6:
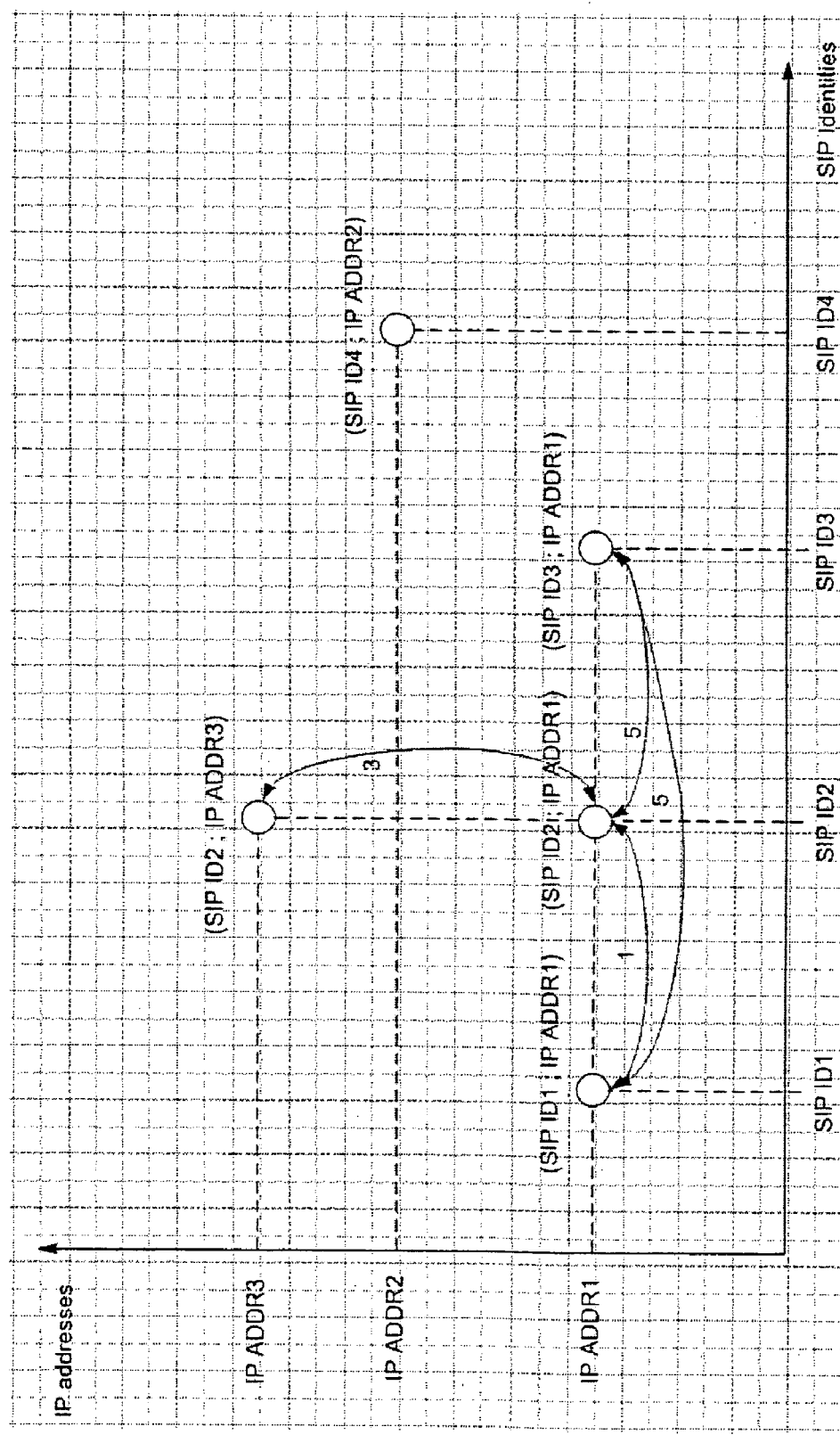
FIG. 6 is a diagram showing the hyperspace referred to in FIG. 5, wherein additionally distances are depicted.

For the example shown in FIG. 5, the defined distances are shown in FIG. 6. For the rest, both figures are identical. The rationale behind the specific example shown is as follows:

Basically, a multitude of transactions originating from the same SIP identity and using different IP addresses are to be regarded as potentially malicious. The probability that they are malicious messages is higher, the higher the number of different IP addresses from which the transactions originate is. Nevertheless, such transactions can also be legitimate and simply result from mobility of the sending user. But the time scale, on which users perform SIP transactions in mobility scenarios, will in general differ from the time scale on which SIP transactions are analyzed. The proposed method normally works in such a way that in particular anomalies on a shorter time scale are discovered.

In general, a multitude of transactions originating from the same IP address, but using different SIP identities will also have to be considered as malicious. Here it holds also true that the probability that such transactions are malicious is higher the higher the number of SIP identities sharing the same IP address is.

This statement becomes invalid in case of a multitude of users being located behind a NAT (Network address Translator) and send SIP transactions. But the probability that a multitude of users behind the same NAT send transactions to the same target address is low enough to stick to the basic assumption. If this probability is not low enough, additional identities, for example port numbers of layer 4, can be used to correctly tell legitimate users behind a NAT from malicious users.

When defining the values depicted in FIG. 6, this possibility is already taken into consideration by defining a larger distance between SIP identities with different domains than between SIP identities with the same domain. This definition considers that users behind the same NAT show with a high probability the same domain in their SIP URI. For the example depicted in FIG. 6 the values for ML are evaluated as follows:

At the arrival of the first message, ML=0 because there is only one point on the plane. When message 2 arrives, it is detected that both extracted identities differ from message 1, so ML=0 still holds true. When message 3 arrives, it is detected that it shows the same IP address as message 1 and the same SIP ID as message 2, so ML=1+3=4. When message 4 arrives it is detected that the IP address matches that of messages 1 and 3, so for ML holds: ML=5+5=10. When message 5 arrives no matches with the previously analyzed messages are detected, so ML=0 is valid.

Regarding further advantageous embodiments of the method according to the invention and in order to avoid redundancy, it is referred to the general part of the description, as well as to the attached claims.

Finally, it is particularly important to point out that the examples of an embodiment of the teaching according to the invention from above only serve as illustration of the teaching as according to the invention, but that they do by no means restrict the latter to the given examples of an embodiment.

The invention claimed is:

1. A method for protecting SIP (Session Initiation Protocol)-based applications wherein SIP messages are analyzed and malicious SIP messages that potentially constitute a security risk for the SIP-based application are identified, the method comprising:
   a plurality of processors programmed to perform:
   extracting a pre-definable number N of pre-configurable parameters identities from the SIP messages;
   comparing said identities with identities extracted from previous SIP messages for each SIP message; and
   assessing a maliciousness level ML on the basis of the comparison results for every SIP message,
   wherein an N-dimensional hyperspace is formed, which is created by the pre-defined identities, and wherein for each individual SIP message one point is entered in the hyperspace, each individual point in the hyperspace represents only one SIP message,
   the maliciousness level ML is computed as the sum of pre-configurable distances between each individual point in the N-dimensional hyperspace, and
   the pre-definable number N is greater than 1.

2. The method according to claim 1, wherein the analysis and identification are performed by a Session Border Controller (SBC), an application layer firewall, a proxy server, a back-to-back user agent, or a client.

3. The method according to claim 1, wherein the extracted identities are user-specific and/or device-specific parameters.

4. The method according to claim 3, wherein the extracted identities comprises a SIP URI of a party sending the message, a MAC address, a Host Identity Protocol (HIP) identifier, a SIP VIA header field value, SIP contact header field value, SDP protocol header field values including the IP address, and ports of the party sending the message.

5. The method according to claim 4, wherein a corresponding result of a transformation of the extracted identities, preferably via a hash function, is used to identify one of the extracted identities.

6. The method according to claim 1, wherein the maliciousness level ML for an n-th message is a function f of points of previous messages entered in the hyperspace.

7. The method according to claim 1, wherein the points are erased from the hyperspace after a configurable duration according to their entry order.

8. The method according to claim 1, wherein the maliciousness level ML for an n-th message is different from zero, if the comparison results in that at least one identity of the point of the n-th message matches with an identity of at least one of the entered points.

9. The method according to claim 1, wherein the maliciousness level ML for an n-th message is higher the higher the number of entered points is for which at least one identity matches the corresponding identity of the point of the n-th message.

10. The method according to claim 1, wherein the maliciousness level ML for an n-th message is higher the higher the number of matching identities between one of the entered points and the point of the n-th message is.

11. The method according to claim 1, wherein the values of the individual distances are fixed values.

12. The method according to claim 1, wherein the values of the individual distances are adjusted dynamically.

13. The method according to claim 1, wherein hash tables are used for storing N-dimensional identities.

14. The method according to claim 13, wherein a hash table is used for each identity.

15. The method according to claim 13, wherein in key columns of the hash tables the corresponding hash value of the respective identity is stored, and as entries respectively the set of identities are stored.

16. The method according to claim 13, wherein shared entries are used in such a way that pointers to shared sets of identities are stored as entries.

17. The method according to claim 1, wherein only those SIP messages are analyzed that have previously passed a syntax analysis without detection of anomalies.

18. The method according to claim 1, wherein a threshold for the maliciousness level is pre-set, and in that a SIP message is classified as malicious when exceeding it.

19. The method according to claim 1, wherein a SIP message that has been identified as malicious generates an alarm and/or is blocked.

20. The method according to claim 18, wherein two or more thresholds are pre-set and different consequences are connected to exceeding each of the respective thresholds.

21. The method according to claim 18, wherein the thresholds are updated dynamically.

22. The method according to claim 1, wherein the SIP messages that have been identified as malicious are further analyzed.

23. A system for protecting SIP (Session Initiation Protocol)-based applications in a network including at least one client device and at least one node involved in communication of said at least one client, wherein said at least one node comprises:
- an analyzer for analyzing SIP messages transmitted and/or received by said at least one client device;
- an extractor for extracting a pre-definable number N of pre-configurable parameters identities from the SIP messages;
- a comparator for comparing said identities with identities extracted from previous SIP messages for each SIP message; and
- an assessing section for assessing a maliciousness level ML on the basis of the comparison results for every SIP message,
- wherein an N-dimensional hyperspace is formed, which is created by the pre-defined identities, and wherein for each individual SIP message one point is entered in the hyperspace, each individual point in the hyperspace represents only one SIP message,
- the maliciousness level ML is computed as the sum of pre-configurable distances between each individual point in the N-dimensional hyperspace, and
- the pre-definable number N is greater than 1.

24. The method according to claim 1, wherein the identities extracted from previous SIP messages are received on a same node as said identities.

* * * * *